Dec. 19, 1950
N. S. SERINIS
2,534,303
METHOD OF MAKING INTEGRATED
CALCIUM SILICATE BODIES
Filed Jan. 16, 1947
2 Sheets-Sheet 1
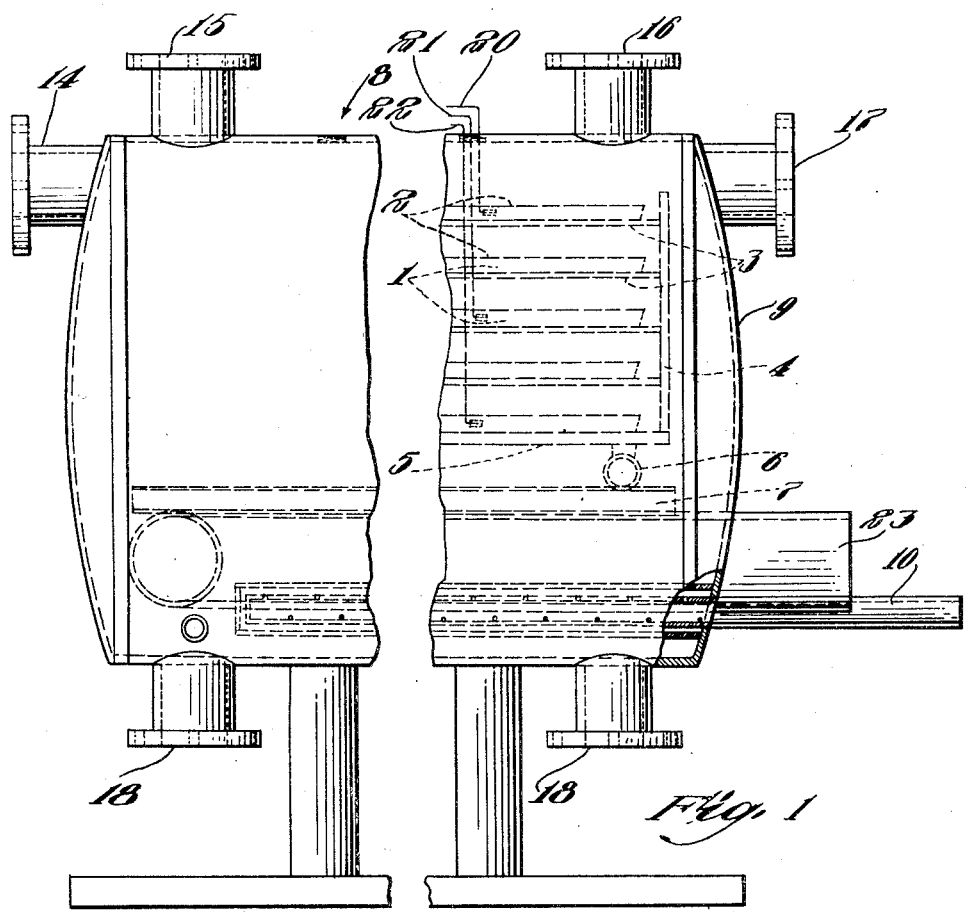
Fig. 1
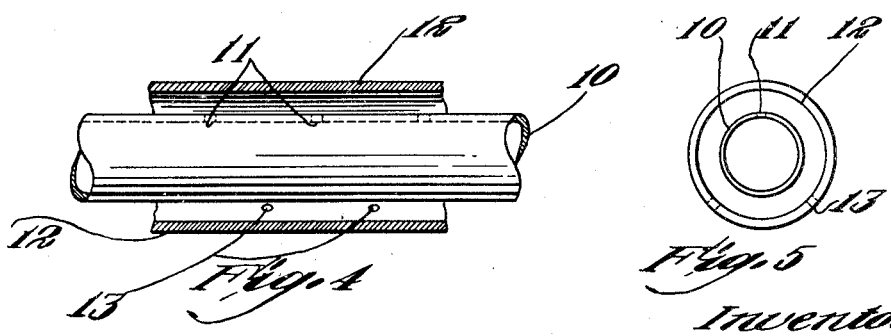
Fig. 4
Fig. 5
Inventor
Neo. S. Serinis
by Roberts, Cushman & Grover
att'ys Dec. 19, 1950  N. S. SERINIS  2,534,303
METHOD OF MAKING INTEGRATED
CALCIUM SILICATE BODIES
Filed Jan. 16, 1947  2 Sheets-Sheet 2

Inventor
Neo S. Serinis
by Roberts, Cushman & Grover
Att'ys.

Patented Dec. 19, 1950

2,534,303

UNITED STATES PATENT OFFICE 2,534,303

METHOD OF MAKING INTEGRATED CALCIUM SILICATE BODIES

Neo S. Serinis, Gloucester, N. J., assignor to Owens-Illinois Glass Company, Toledo, Ohio, a corporation of Ohio Application January 16, 1947, Serial No. 722,333

1 Claim. (Cl. 25—155)

This invention relates to a method of treating certain reactive mixtures of finely divided solids and liquids to effect chemical reaction and integration of the same and the production of a dried indurated solid product therefrom.

In the arts, it is a more or less common objective to prepare integrated solid bodies by the inter-reaction of finely divided solid ingredients through the medium of a liquid, such as water. The liquid medium serves as a preliminary dispersing or associating and shaping medium with respect to the finely divided solids. It also serves as a chemically reactive medium to promote both chemical reactions and changes in physical state between the reactive components of the mass. In such compositions it is common procedure to subject the shaped mass to heat in order to completely mature the mass and subsequently to remove excess liquid. But while the effect of heat, or rise of temperature, is thus advantageous if not essential to such processes, it is also fundamentally opposed in some ways to the principal effect which is desired to be produced, namely, the integration of the mass and development of the strength and uniformity of structure of the product. One of these adverse effects is the disruption of the mass by the liquid during heating because of its thermal expansion. A second adverse effect is the disruption of the set mass by rapid vaporization of the interstitial liquid. It has accordingly been the long established practice, in arts involving such compositions and procedures for working with them, to effect the chemical reaction of such mixtures substantially to completion and thereafter to expel the surplus liquid medium from the finished product, in separated operations and in separately operated apparatus, such as an autoclave and a drying chamber, respectively. When these separated operations are used, the conditions of operation are critical, and special care must be exercised to produce a good product.

Exemplifications of such arts are found, in common, to present the familiar successive steps of mixing finely divided granular solids or powders with water in sufficient quantity to form a fluid or plastic consistency, casting the mixture in a mold, heating the mixture to the required temperature and pressure to prevent vaporization of the water at the temperature employed, as in an autoclave, for the required period of time to effect the chemical reaction of the several ingredients to a completely "set" condition, then releasing the pressure, then removing the shaped object from the autoclave, and finally removing the interstitial water therefrom by drying at atmospheric pressure, in a drier.

In some arts, such as ceramics, the wet mixture cannot be heated to sufficient temperature to effect the desired setting reaction between the ingredients. The ceramic arts are therefore apart from the scope and application of the present invention.

It is an object of the present invention to provide an improved method of effecting chemical reactions and a change in physical state in reactive mixtures of finely divided solids and a liquid, to integrate and/or indurate the same and remove the interstitial liquid, preferably in one and the same operation and apparatus. It is a further object to bring about improvements in the products which may thereby be obtained. Other objects will appear from the following disclosure.

It is now found, as an underlying concept of the present invention, that reactive mixtures of finely divided solid particles containing an intervening liquid phase, as a medium for their dispersion, association, solution and chemical reaction may be heated and their chemical reactions and changes in physical states promoted and completely controlled, if the wet mass is surrounded by a gaseous phase consisting substantially exclusively of vapors corresponding to the liquid medium contained therein, at appropriate temperatures for such reactions and at pressures sufficient to prevent and/or control the vaporization of the liquid medium of the mass throughout the treatment. It is discovered that under these conditions the chemical reactions and changes in physical state in the mass may be determined both in kind and in degree by appropriate control of the temperature and/or pressure of the surrounding gaseous phase thus provided. It is now further found that the reactive mass, at any desired or appropriate stage of such chemical reaction or physical development may, through the medium of the surrounding vapor phase, as thus provided, without preventing the setting reactions, be liberated from any predetermined portion of the liquid component, either to a desired equilibrium with its vapor phase in the gaseous envelope, or to a controlled relationship between the two, and/or to complete dryness with respect to the liquid phase component of the mass. The gaseous phase or vapor envelope thus serves as a heat and pressure transfer medium through which the conditions of reaction of the liquid-solids mixture and evaporation from the resulting product may be continuously and definitely effected, controlled, and completed, from outside the envelope.

It is therefore now found that a reactive mass of finely divided solids and liquids may be both reacted to any desired degree of integration or induration and the liquid component reduced to any desired degree (including dryness) and that these steps may be done, either successively or simultaneously or both. That is, it may be first integrated and/or indurated, for the desired time or to the desired degree under pressure conditions preventing evaporation and then dried, both steps being brought about by means of the vapor phase corresponding to the liquid component in a continuous operation. This procedure, moreover, results in a product having the desired degree of integration and induration and containing any predetermined amount of the interstitial liquid.

It may be pointed out by way of example, that alkaline earth compounds and siliceous or aluminous mixtures, such as finely divided particles of calcium hydroxide and finely divided particles of silica, including synthetic or natural silica (quartz, diatomaceous earth, etc., or alumino-silicates and such), are known to be reactive in the presence of water, as the liquid medium, to form hydrous calcium silicates.

In such reactive mixtures, the volume relation of liquid to solids is important. It is now found that it may be made positively determinative of the apparent density of the reacted integrated product. This may be accomplished by maintaining such relation throughout the integrating reaction or at least the first part of it, to the point of effecting a self-sustaining consistency. That is, sufficient to permit withdrawal of the liquid component (water) without disruption. If the proportion of liquid to solids is not more than sufficient to wet or just fill the voids between the solid particles, e. g., calcium hydroxide and silica (and other solid materials, if added) the contacting particles of the resulting charge usually present sufficient resistance to deformation to retain the shape of the mixture throughout any necessary heat treatments and reactions of its components, though some slumping or consolidation is frequently manifest. At the end of such treatment the large proportion of solid components to the water component may retain sufficient residual heat to vaporize substantially completely the liquid water component, simply upon removal from the heating chamber by "flashing," leaving a substantially dry integrated solid product. There is accordingly no primary problem in the heat treatment of such close-packed, dense, form-retaining, relatively dry mixtures. However, the present invention may be applied to them.

In mixtures such as, for example, of finely divided calcium hydroxide and finely divided silica, with sufficient water to more than fill the interstices between the solid particles, however, the solid particles are separated or dispersed by the liquids so as to occupy a greater volume and so as to manifest plastic or liquid flow. The resulting charge is not resistant to deformation and does not retain its shape or dimensions throughout a prolonged or slow heat treatment. It is accordingly the practice of the art to retain such mixtures in molds or the like through the heat treatment for the development of the ultimate required degree of integration without permitting the escape of the liquid medium in which the solid particles are dispersed. This has been effected by subjecting the reaction mass in an autoclave to a temperature and to a sufficient pressure to prevent vaporization of the water component, therefrom, for sufficient time to effect complete induration. If this is not done, considerable shrinkage and cracking result. The charge is then released from pressure and removed from the autoclave. A part of the water "flashes" off as steam. The product is then reheated at atmospheric pressure to expel the remaining water and dry the solidified integrated reaction mass to the degree desired. The release of pressure, "flashing" and final drying operations frequently introduce cracking and spalling of the ware thus made.

By the present invention it is found that such mixtures, especially those in which the liquid is the dominant or determining component (for example, of finely divided calcium hydroxide and finely divided silica, and water), may be surrounded by a gaseous envelope which is characterized by consisting substantially or exclusively of a vapor phase corresponding to the liquid component, namely, water vapor or steam. Both the development of the integrating or indurating reactions progressively throughout the mixture and also the progressive removal of the liquid water phase therefrom, to any desired degree or even to complete drying of the charge, may thus be effected substantially without shrinkage or distortion, spalling, etc., through the regulation and control of such gaseous, water vapor envelope, as the heat and pressure transfer medium, for the required period of time, and to effect any degree of integration, induration and drying desired. By such procedure the entire integration reaction with or without further or complete induration of the charge, and the desired degree of drying of the product may be obtained in a single continuous step, consecutively or simultaneously, in the same gaseous medium and apparatus, under accurately controllable conditions. Moreover, the finished product may be removed from such environment with safety and assurance of retaining its predetermined and characteristic shape, dimensions and developed properties.

In such procedure the input of heat required initially to effect and maintain the maturing temperature for integration or induration is introduced by means of or through the vapor phase, steam envelope.

The withdrawal of water from the charge is also effected through the steam envelope, as when the latter is regulated to be relatively superheated so as to promote evaporation of water from the charge for drying.

Throughout the procedure heat is characteristically supplied to the charge of ware through the water vapor envelope surrounding it, not only to raise it to and maintain it at its maturing temperature but also to provide the heat of reaction and heat of vaporization of the water component, when evaporation is being effected, from an external source rather than from the residual heat of the charge itself. Thus, the overall time-temperature-pressure conditions of the treatment throughout the heating up, integration, induration and drying periods may be accurately controlled at all stages and rendered specifically effective to develop any particular degree or kind of integrating reaction, induration, evaporation or drying desired.

Thus, for example, the heat input may be such that the time-temperature relation may be regulated, while maintaining a saturated atmosphere of water vapor, so that it will effect reaction and integration between the components of the charge. The temperature may be raised, or the pressure lowered or both, the necessary heat being thus transmitted to the charge from an external source by means of the vapor phase envelope, thereby to permit and effect the vaporization of water from the charge at such a rate and to such a degree as desired. Under these conditions the evaporation and removal of liquid water, in the form of water vapor, may be permitted to proceed from very slowly to very rapidly, as determined by actual experience, but at all times under accurate control, and in terms of the attained condition of the reaction mixtures and hence without danger to the matured mass, and carried to any degree desired in the product. With control of atmospheric environments, the desired conditions of the ware under treatment are accordingly assured, by prevention of undue pressure, temperature, evaporation, or other changes which might cause undue stresses, strains or fractures therein if, for example, they were not thus controlled or if the heat of vaporization were to be derived in large part or entirely from the heated ware itself.

With reactive mixtures of finely divided solids and liquids, which react rapidly at elevated temperatures, particularly at and above the boiling temperature of the liquid, it is found that upon being brought to maturing temperature they may become integrated or indurated in a short time to such a degree that controlled removal of the intervening liquid by means of this invention may be commenced, without the danger of disrupture of the structure. However, the evaporation must not be permitted to progress more rapidly at any time or place than being desirable for the completion of the maturity for the material so treated. Thus, where a certain minimum amount of water is required for the attainment of the desired maturity, evaporation should be controlled in such a manner that this minimum amount of water will be retained up to that time at which the said desired maturity will be reached. In some instances, within the invention, evaporation may be commenced at the outside even before the material has developed sufficient strength throughout its thickness, provided that evaporation will progress from the outside in, commensurably with the development of strength from the outside in.

A typical and representative example of the procedure of the invention in actual practice will be described as applied to mixtures of finely divided hydrated lime, finely divided reactive silica, in the form of finely divided quartz or diatomaceous earth, or both, and water, and carried out in an autoclave, such as is illustrated in the accompanying drawings in which:

Fig. 1 is a longitudinal vertical section of a horizontal, cylindrical autoclave, with parts broken away, showing appropriate steam and hot gas or liquid equipment, control means and a car loaded with shaped ware indicated therein;

Figs. 4 and 5 are details of the steam inlet pipes.

Figure 2:
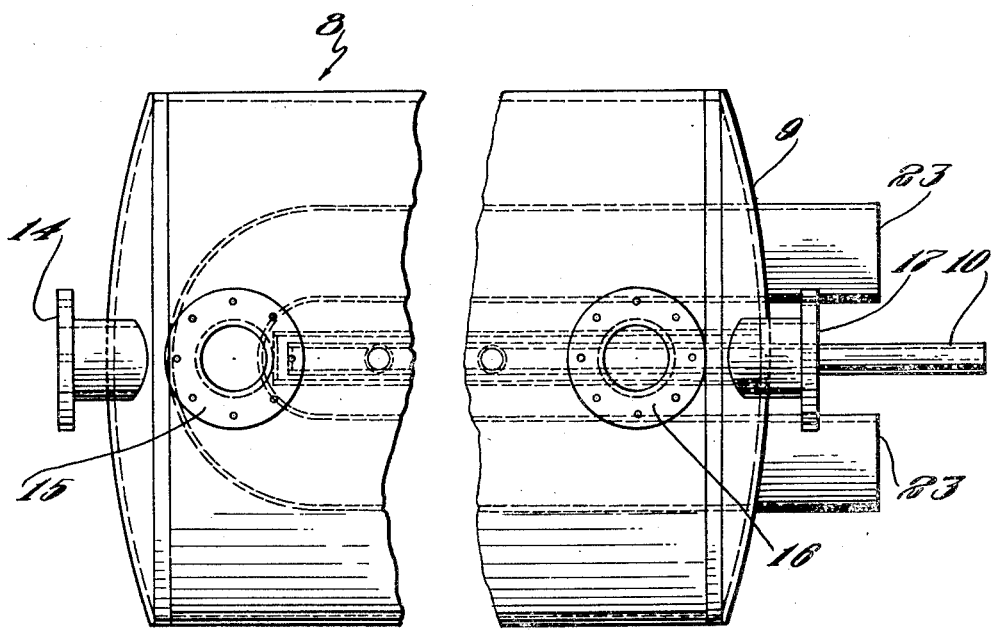
Fig. 2 is a longitudinal view of the same.
Figure 3:
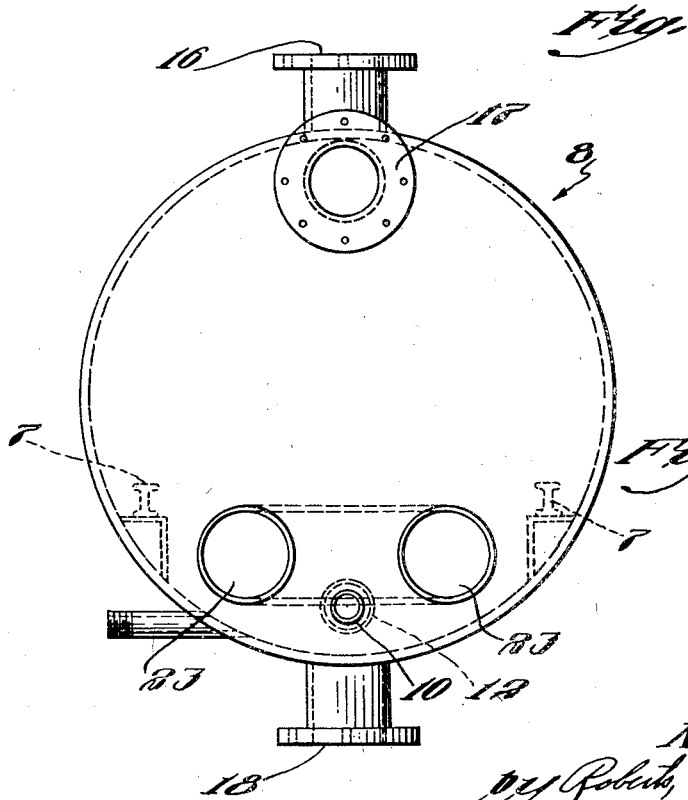
Fig. 3 is a vertical cross section of the same.

The initial preparation of the mixture to be treated may be in accordance with known principles and practices of the prior art. However, as already pointed out, the invention is more particularly applicable to mixtures of finely divided solids and liquids in which the volume of liquid is more than sufficient to fill the interstices between the solid particles and hence disperses the latter and primarily determines the overall volume of the mixture. In such compositions the volume of liquid to volume of solids ratio is usually greater than 1:1, and the principal input and extraction of heat, with respect to the above mixture, is taken up by and withdrawn from the aqueous component.

Thus, for example, mixtures of finely divided hydrated lime or quick lime (30% by weight) and finely divided silica or diatomaceous earth, e. g., 50% by weight, or reactive alumino-silicates, and 20% of short and fine asbestos fibers may be mixed with water and dispersed in such proportions as will correspond to and determine the apparent density of the integrated product to be made therefrom by employing various procedures and additions to preserve the solid components in uniform dispersion with the liquid component throughout the shaping and integrating operations, at least to the point of attaining a self-sustaining consistency. For example, if 1 part of the solids component is dispersed in 5 parts or more by weight of water and this relationship maintained during the shaping and integrating operations, and the integrated product, occupying the original volume of the mixture is also dried, the dried product will have a weight and apparent or overall density which is about one-sixth or less of the original mixture. In this way, it is apparent that the proportion of the liquid component used determines the density of the final product obtained so long as uniformity is maintained and continuous integration effected throughout the shape and dimensions of the original mixture. Of course the kind and degree of integration must be consistent with the ability of the reactive products to sustain the low density thus given to the mixture during integration and to the finished product.

The solids-liquid mixture, as first prepared, may be poured or otherwise shaped. It may, for example, be molded in thin walled metal molds 1, in the form of sheets, slabs, blocks or the like. In this form the molded mixture is ready for the present process, or it may, by a preliminary treatment, already have acquired a pre-thickened or a pre-set condition, even up to that of possessing a self-sustaining consistency, in which case the form-retaining molds may be removed before subjecting it to the present process.

The mixture, therefore, in the form of molded (or shaped) ware 2 (i. e., within or without the molds 1) is placed upon suitable supports such as the racks 3, supported on uprights 4 of a truck 5, having wheels 6, to run upon the tracks 7, into the autoclave 8. The door 9 is closed and bolted and saturated steam rapidly introduced through the steam pipe 10 in the bottom of the autoclave having perforations 11, throughout its length. The steam inlet pipe is preferably baffled, so that the steam shall not impinge upon the ware, as by an outer jacket 12 which is also perforated, as at 13, 13, in staggered relationship to the perforations 11 in pipe 10. The air in the autoclave is quickly and completely swept out, through escape vents or pressure-release valves 14, 15, 16, 17 and also a quick acting sump and pressure release valve 18 in the lowest portion of the bottom of the autoclave.

When the air has been substantially or entirely displaced by steam, the pressure and temperature may be increased. When the ware has acquired, through reaction, a self-sustaining consistency, say four hours in the instant case, evaporation of the water component may be permitted to commence. But since the setting reaction of the mixture requires the presence of water, the vaporization of the water from the ware should preferably not be permitted to commence before or at any time to progress more rapidly than the integration and induration of the ware to a self-sustaining consistency, though not necessarily to the ultimate strength to be developed by the integrating and/or indurating reactions.

The condition of the ware throughout may be governed in terms of the temperature and pressure of the steam atmosphere and of the temperature (and other conditions) of the reaction mixture, as by means of pyrometers 20, 21, 22, etc., inserted through appropriately closed passageways through the walls of the autoclave, and located in suitable positions in the autoclave, around or within the ware, etc., as desired. These pyrometers are conveniently connected to automatic temperature recorders, so that a complete and continuous record of temperature conditions is available.

In the instant case a (saturated) steam pressure of 125–150 lbs. per square inch and corresponding temperatures (353° F. to 178° C., to 366° F. or 186° C.) may be developed and is satisfactory. With freshly cold-molded (or shaped) ware 2″ thick, a period of 3 to 4 hours is sufficient. With some previously thickened or self-sustaining mixtures, this period may be shortened. In any event, vaporization of the water from such self-sustaining surface may then be instituted. This may be done by a slight increase in temperature or decrease in pressure of the steam atmosphere.

During the heating up stage input of heat may be effected by input of saturated steam into the autoclave as described. During the subsequent integration, induration and drying stages, heat may be transmitted into the ware by means of the steam atmosphere, as by introducing saturated steam first through the steam pipes 10 and then, in the later stages, superheated steam through the same pipes. Such heat may be supplied by means of a closed heating conduit 23, which forms a closed loop through the autoclave, supplied with a current of hot gases at the required temperature (e. g., 400°, 500° or 600° F.) and regulated in step with the process. Hot liquids, of appropriate boiling points, may be used to acquire and transmit whatever temperatures may be necessary.

In this way, while a source of saturated steam at the desired temperature and pressure may supply all of the heat for the ware initially, and maintaining the desired temperature in the autoclave during initial integration, the same steam atmosphere may then be employed and its temperature increased and maintained at a higher temperature or lower pressure, or both, as a heat transfer medium by direct conduction from outside sources at the required temperature and for the total time and to effect heating, reaction, volatilization, and removal of water from the ware, to the extent desired. Ordinarily, however, the residual moisture should not be below about 5% by weight, in the finished ware.

The water-saturated surface of the ware may be first brought up to the desired reaction temperature by contact with saturated steam and integrated to self-sustaining consistency. The temperature of the steam atmosphere then may be raised to a slightly superheated condition, or the pressure may be allowed to drop slightly, or both, thus inducing vaporization and evaporation of some of the water component therefrom. This differential, for evaporation, may, for example, be about 50° to 200° F. The drying steam atmosphere, which will be at a higher unit heat content than steam in the boiler, will drive superheated steam to the boiler, and thus carry water evaporated from the ware in the autoclave to the boiler, or other vessel, or be wasted. The next, or inner zone, of the ware may by this time already be at the desired reaction temperature, and while the outer surface is being dried, its reaction will proceed to a similar stage. The inner zone will receive heat through the outer, drying surface or zone at a temperature corresponding to the dew-point or wet bulb temperature of the evaporating surface but sufficient to induce and promote the setting reaction of the solid liquid reactive mixture.

Thus, the ware will be subjected to a progression of successive heating up to reaction temperature, reaction to self-sustaining consistency, evaporation of some of the liquid phase, and drying to the water content desired.

It is, of course, important that the evaporation of the water shall not exceed the development of the integrating reaction, but it is found that a zone of the reaction mixture, if sustained by itself or surrounding zones of reacted material, may have some of the free water therein vaporized and removed and yet retain sufficient water, either by chemical combination, occlusion, absorption or capillary retention, without the presence of the excess, free water, originally relied upon to effect and maintain the dispersion and distribution of the finely divided separate solid particles, to complete the chemical and physical reactions thereof.

When the water contained in the ware has been removed to a sufficient degree, say to 5 to 10% by weight or less, pressure of the steam atmosphere may be rapidly lowered, without danger of damage to the ware, and the ware removed from the autoclave at once.

Typical instances of the shapes, dimensions, and densities of products made from compositions corresponding to that described above are given in the following table, together with the time for integrating, indurating and drying and the maximum temperatures employed:

|  | Type of Material | | | | | |
| --- | --- | --- | --- | --- | --- | --- |
|  | 4″ pipe cover | 4″ pipe cover | Slab | Slab | Slab | Slab |
| Thickness, inches | 1½ | 2¼ | 2¼ | 3¼ | 4 | 3¼ |
| Density, p. c. f | 10.5 | 10.5 | 10.5 | 10.5 | 10.4 | 10.5 |
| Total Time, Indur. and Drying, hours | 6:35 | -------- | 13:00 | 24 | 24 | 23 |
| Moisture, Final Product, percent weight | 1.94 | 10.9 | 7.4 | 4.0 | 10.6 | 10.4 |
| Maximum Temperature, °F | 450 | 450 | 595 | 590 | 595 | 450 |

A comparison of the time required by the procedure of the present invention and the procedure of the prior art is given in the following table:

| Simultaneous Induration and Drying | | Complete Induration and Subsequent Hot Air Drying | | | |
|---|---|---|---|---|---|
| Time, Indur. and Drying, Hours | Modulus of Rupture, Average | Time, Indur. | Drying | Total time, Hours | Modulus of Rupture, Average |
| 15 | 50 | 14 | 20 | 34 | 50 |
| 18 | 53 | 14 | 20 | 34 | 48 |
| 20 | 52 | 14 | 20 | 34 | 53 |

I claim:

In the method of producing an integrated hydrous calcium silicate from a slurry comprising a mixture of finely divided materials containing reactive lime and reactive silica and water, the step of reacting the lime and silica of said mixture to substantial completion in a closed system in an atmosphere substantially exclusively of super-heated steam whereby drying of the mixture proceeds simultaneously with the reaction.

NEO S. SERINIS.

REFERENCES CITED

The following references are of record in the file of this patent:

UNITED STATES PATENTS

| Number | Name | Date |
|---|---|---|
| 577,060 | Owen | Feb. 16, 1897 |
| 1,899,137 | Crume | Feb. 28, 1933 |
| 2,240,963 | Swezey et al. | May 6, 1941 |